Oct. 2, 1928.

C. O. WYMAN 1,686,431

DIFFERENTIAL

Filed Nov. 5, 1925

Witnesses:
Orie S. Wyman
John P. Coleman

Inventor:
Charles O. Wyman

Patented Oct. 2, 1928.

1,686,431

UNITED STATES PATENT OFFICE.

CHARLES O. WYMAN, OF ANOKA, MINNESOTA.

DIFFERENTIAL.

Application filed November 5, 1925. Serial No. 67,074.

My invention consists of a novel and useful improvement in differentials for automobiles, power trucks and tractors, where the power can be located on the machine and applied to the four carrying wheels for propelling the machine, or for any other desired purpose.

My invention relates to that particular kind of differential, which permits of its being located on the driving shaft, or any other desired place, and relieves the axles of that bungling encumbrance so usual in the ordinary automobile.

The machine consists of a triple differential, constructed with a central, main or prime differential having its central member rigidly mounted on a central, hollow, driving shaft with a secondary differential rigidly attached to its respective side gears or flanges, the prime differential balancing the drive of the two axles, while the secondary differentials balance the drive of the carrying wheels on the respective axles.

It also consists of a hollow, driving shaft, which admits oil into the same and forces it out through the orifices in the respective shafts by centrifugal force and oils the same, which when driven under heavy speed would not receive oil from the outside.

I accomplish this by rigidly attaching the casing of the secondary differentials to the side flanges of the prime differential and mounting the flanges of the secondary differential on hollow shafts and allowing the hollow shafts of the inner flanges to pass loosely out through the hollow shafts of the outer flanges and connecting the respective hollow shafts with the four carrying wheels to propel the machine.

I use various devices to accomplish this purpose. The construction of some is slightly different, but all embody the same general principles, enough of which are illustrated in the drawings and described in the specifications to enable those skilled in the art to construct the same, while I have pointed out in the claims the full scope of my invention.

In the accompanying drawings forming part of this specification

Figure 1:
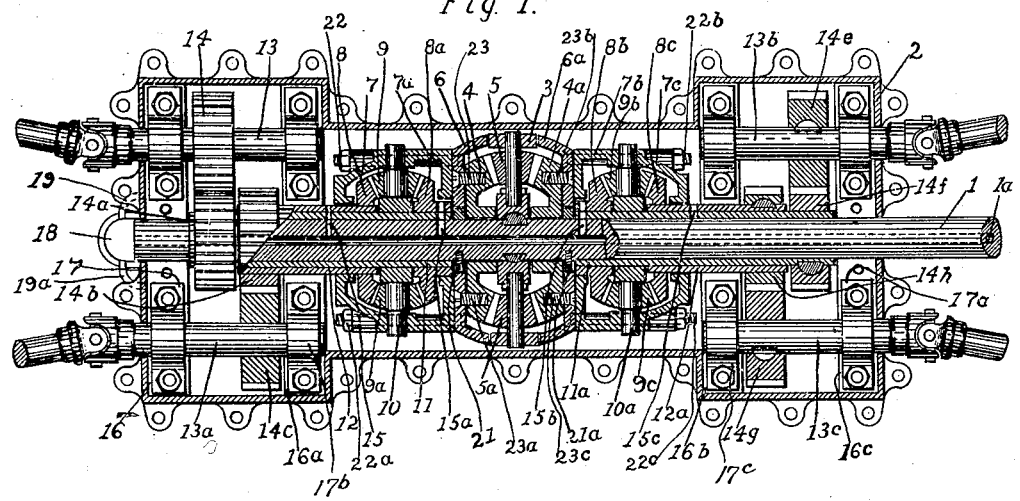
Fig. 1 is a sectional plan of my differential.
Figure 4:
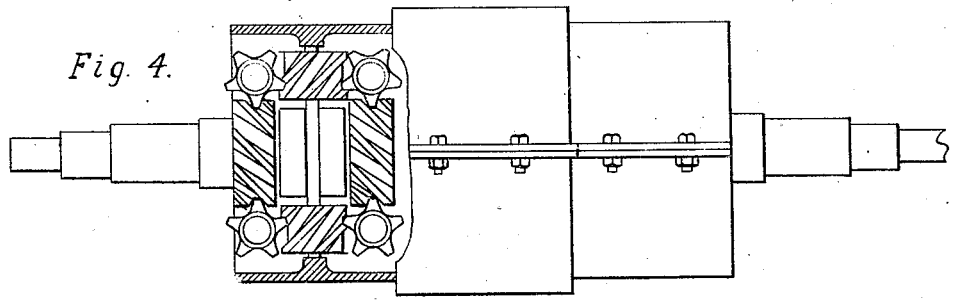
Fig. 4 is an elevation showing manner of constructing the differential with worm gears, forming an automatic locking, triple differential.
Figure 2:
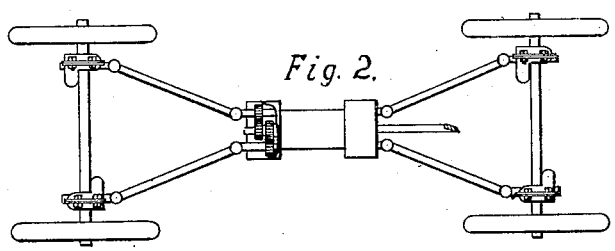
Fig. 2 is a plan view of one of the means of connecting my differential with the four carrying wheels.
Figure 3:
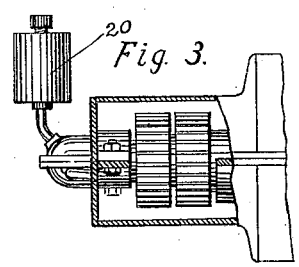
Fig. 3 is an elevation showing the oil cup located on the oil case.

In the accompanying drawings forming part of this specification

"1" is a hollow, self-oiling, central driving shaft on which the different differentials are mounted; "$1^a$" is a hole in center of the main driving shaft into which oil is driven and forced out through the orifices 15, $15^a$, $15^b$, and $15^c$ by centrifugal force to oil the respective hollow shafts; "2" is the case of the machine; "3" is the center of the prime differential; "4" and "$4^a$" are its side gears; "5" and "$5^a$" are its pinions; "6" and "$6^a$" are its cases; "7", "$7^a$", "$7^b$" and "$7^c$" are the cases of the secondary differentials which are rigidly attached to the side flanges of the prime differential and are revolved with the same; "8", "$8^a$", "$8^b$" and "$8^c$" are the side flanges of the secondary differential; "9", "$9^a$", "$9^b$" and "$9^c$" are pinions for the same; "10" and "$10^a$" are their centers; "11" and "$11^a$" are hollow shafts loosely located on the main driving shaft on which gears "$8^a$" and "$8^b$" are rigidly mounted; "12" and "$12^a$" are hollow shafts loosely located on shafts "11" and "$11^a$"; side gears "8" and "$8^c$" are rigidly mounted on the same. "13", "$13^a$", "$13^b$" and "$13^c$" are propeller shafts journaled on supporting beams "16", "$16^a$", "$16^b$" and "$16^c$"; "14", "$14^c$", "$14^e$" and "$14^g$" are gears mounted on the same and intermeshing with gears "$14^a$", "$14^b$", "$14^f$" and "$14^h$", rigidly mounted on the respective hollow driving shafts "11", "$11^a$", "12" and "$12^a$", all of which are loosely mounted and operated independently, the same being oiled through orifices "15", "$15^a$", "$15^b$" and "$15^c$" through hole "$1^a$"; said oil being forced out by centrifugal force. "16", "$16^a$", "$16^b$" and "$16^c$" are supporting beams on the case, on which journals "17", "$17^a$", "$17^b$" and "$17^c$" are mounted; "18" is the oil case; "19" and "$19^a$" are oil tubes transmitting oil from the main case "2" to oil case "18"; "20" is an oil cup located on the oil case "18"; "21" and "$21^a$" are collars rigidly mounted on driving shaft "1", holding gears "4" and "$4^a$" in place; "22", "$22^a$", "$22^b$" and "$22^c$" are bolts rigidly holding the secondary differential to primary cases "6" and "$6^a$"; "23", "$23^a$", "$23^b$" and "$23^c$" are bolts rigidly attaching primary cases "6" and "$6^a$" to primary gears "4" and "$4^a$".

Having described my machine I think it will be readily understood, also the working principles, power being applied by the driving shaft "1" from the motor to the differential and distributed to the different carrying wheels to propel the machine.

What I claim is:

1. In combination, a drive shaft, a primary differential having a middle gear section keyed to the shaft, said differential including side gears loose upon the shaft, and a differential casing carried by each side gear, each casing having a middle gear section connected therewith, and two side gears, and sleeves independently rotatable upon the shaft in superposed relation, and connected with side gears of the last mentioned differentials.

2. A device of the class described comprising a drive shaft, a primary differential having a middle section keyed to the shaft and including side gears loosely rotatable upon the shaft and secondary casings one attached to each side gear of the first mentioned differential, and each including middle and side gears, the middle gear movable with its casing, the side gears of the respective secondary differentials being respectively connected with sleeves, which surround the drive shaft and rotate upon said shaft and upon each other.

3. A device of the class described comprising a drive shaft, middle and laterally arranged differentials upon the shaft, each having a central gear and two side gears, the side gears of the middle differential being loose upon the shaft, the central gear being keyed to the drive shaft, and superposed sleeves inner and outer traversed and supported by the drive shaft, a pair for each lateral differential, said lateral differentials having their central gears loosely rotatable upon respective inner sleeves, and having their side gears keyed to respective inner and outer sleeves, the pinions and central gears of the lateral differentials being connected to move with respective side gears of the middle differential.

4. In combination with a four wheeled vehicle having drive means for each wheel, a drive shaft, middle and laterally arranged differentials encircling the shaft, each having central gears, and two side gears, the side gears of the middle differential being loose upon the shaft, the central gear being keyed to the drive shaft, superposed tubular sleeves, inner and outer, traversed and supported by the drive shaft, a pair for each lateral differential, said lateral differentials having their central gears loosely rotatable upon respective inner tubular sleeves and having their side gears keyed to respective inner and outer sleeves, the pinions and central gears of the lateral differentials being connected for rotation with respective side gears of the middle differential, and means, operatively connecting the tubular shafts, each with one of the wheel driving means.

5. A device of the class described comprising a main drive shaft, a primary differential consisting of a central and two side gear sections all directly supported upon the shaft, the middle section only being keyed thereto, a secondary differential also comprising a central and two side gear sections, and having a casing movable with one of the side gears of the primary differential, the middle gear section of the last mentioned differential being movable with the casing, and superposed sleeves to which the side gears are respectively fixed, one of the sleeves being rotatable upon the drive shaft.

6. A device of the class described comprising a main drive shaft, a primary differential consisting of a central and two side gear sections all directly supported upon the shaft, the middle section only being keyed thereto, secondary differentials each comprising a central and two side gear sections and a casing, the casings being movable with respective side gears of the primary differential, and middle gear sections of the secondaries being movable with respective casings, and superposed sleeves to which the side gears are respectively fixed, one of the sleeves being rotatable upon the drive shaft, and the middle gear sections of the secondaries being respectively rotatable upon that sleeve which is rotatable upon the shaft.

In testimony whereof, I have hereunto set my hand, this 3rd day of November, 1925.

CHARLES O. WYMAN.